(12) United States Patent
Johnston

(10) Patent No.: US 12,043,369 B1
(45) Date of Patent: Jul. 23, 2024

(54) PROPELLER OUTER SLIPSTREAM CONTROL SYSTEM FOR COUNTER-ROTATING PROPELLERS

(71) Applicant: Richard P. Johnston, Guntersville, AL (US)

(72) Inventor: Richard P. Johnston, Guntersville, AL (US)

( * ) Notice: Subject to any disclaimer, the term of this patent is extended or adjusted under 35 U.S.C. 154(b) by 140 days.

(21) Appl. No.: 16/820,139

(22) Filed: Mar. 16, 2020

Related U.S. Application Data

(63) Continuation of application No. 15/221,579, filed on Jul. 27, 2016, now Pat. No. 10,618,633.

(60) Provisional application No. 62/325,689, filed on Apr. 21, 2016, provisional application No. 62/197,156, filed on Jul. 27, 2015.

(51) Int. Cl.
| | |
|---|---|
| *B64C 11/48* | (2006.01) |
| *B64C 11/02* | (2006.01) |
| *B64D 27/10* | (2006.01) |
| *F01D 1/26* | (2006.01) |

(52) U.S. Cl.
CPC ............. *B64C 11/48* (2013.01); *B64C 11/02* (2013.01); *F01D 1/26* (2013.01); *B64D 27/10* (2013.01)

(58) Field of Classification Search
CPC ......... B64C 11/48; B64C 11/02; B64C 11/28; F01D 1/26; F01D 5/06; B64D 27/10; F05D 2220/324; F05D 2220/325; Y02T 50/66; F04D 29/329
See application file for complete search history.

(56) References Cited

U.S. PATENT DOCUMENTS

| | | |
|---|---|---|
| 10,618,633 B1 | 4/2020 | Johnston |
| 2010/0206982 A1 | 8/2010 | Moore et al. |
| 2013/0315701 A1 | 11/2013 | Neuteboom |
| 2013/0343892 A1 | 12/2013 | Stretton et al. |

OTHER PUBLICATIONS

General Electric Company, "Propulsion System Studies for an Advanced High Subsonic, Long Range Jet Commercial Transport Aircraft," NASA CR-121016; R72 AEG 296, Nov. 1972, 157 pgs.
General Electric Company, "Quiet Clean General Aviation Turbofan (ACGAT) Technology Study," Contract NAS3-19429, Final Report, vol. 1, Dec. 1975, 191 pgs.
Groeneweg, J.F., et al., "Advanced Propeller Research," NASA Report N92-22537, Aeropropulsion, 1987, p. 383-406, 24 pgs.
Groeneweg, J.F., et al., "NASA Advanced Propeller Research," Royal Aeronautical Society—Cranford Institute of Technology, England, NASA Report N89-15913, 1988, p. 1-32, 34 pgs.
Guynn, M.D., et al., "Initial Assessment of Open Rotor Propulsion Applied to an Advanced Single-Aisle Aircraft," AIAA-2011-7058, 10th AIAA Aviation Technology, Integration and Operations Conference, Virginia Beach, VA, Sep. 2011, 16 pgs.
Hager, R.D., et al., "Advance Turboprop Project," NASA Report SP-495, 1988, 131 pgs. (Submitted in two parts: Part 1of 2, 66 pgs.: Part 2of 2, 65 pgs.).

(Continued)

*Primary Examiner* — Topaz L. Elliott
*Assistant Examiner* — Jesse M Prager
(74) *Attorney, Agent, or Firm* — Frost Brown Todd LLP

(57) ABSTRACT

A counter rotating propeller system comprises a structure configured to control the front propeller outer slipstream and prop wash. Specifically disclosed is a structure configured to vary the effective hub-tip radius ratio of the rear propeller.

13 Claims, 4 Drawing Sheets

(56) References Cited

OTHER PUBLICATIONS

Hendricks, E.S., et al., "Performance and Weight Estimates for an Advanced Open Rotor Engine," 48th Joint Propulsion Conference and Exhibit, AIAA, ASME, SAE, and ASEE, AIAA-2012-3911, Atlanta, GA, 2012, 18 pgs.

Hepperle, M., et al., "Future Global Range Transport Aircraft," RTO-Symposium on Unconventional Vehicles and Emerging Technologies, Brussels, 2003, 14 pgs.

Johnston, R.P., "The Variable Cycle Diesel as an Aircraft Engine," SAE 891065, General Aviation Meeting & Exposition, Wichita, KS, 1989, 8 pgs.

Johnston, R.P., "Possible Solution for USAF Material Command Requirement for a 75 Ton Payload .8 Mach Cruise Global Freighter with Un-refueled Round the World Range," 51st AIAA/SAE/ASEE Joint Propulsion Conference, Jul. 2015, 8 pgs.

Keith, J.S., et al., for General Electric Company, "User's Manual for Streamtube Curvature Analysis Analytical Method for Predicting the Pressure Distribution About A Nacelle at Transonic Speeds," NASA CR-112239, vol. 1, Dec. 1972, 219 pgs.

Khalid, S.A., et al., "Open Rotor Engine Aeroacoustic Technology Final Report," Continuous Lower energy, Emissions and Noise (CLEEN) Program, Submitted by General Electric, FAA Report DOT/FAA/AEE/2014-03, May 2013, 36 pgs.

Ko, A., et al., "MDO of a Blended-Wing-Body Transport Aircraft with Distributed Propulsion," AIAA-2003-6732, AIAA's 3rd Annual Aviation Technology, Integration, and Operations (ATIO) Technical Forum, Denver, CO, Nov. 2003, 12 pgs.

Mikkelson, D.C., et al., "Summary of Recent NASA Propeller Results," AGARD Fluid Dynamics Panel Meeting on Aerodynamics and Acoustics of Propellers, Toronto, Canada, 1984, 39 pgs.

Oliver, W.R., "Results of Design Studies and Wind Tunnel Tests of an Advanced High Lift System for an Energy Efficient Transport," NASA Report N84-33403, 1988, 373 pgs.

Wilkinson, P.H., *Diesel Aviation Engines*, National Aeronautics Council, Inc., New York, 1940, Chapter 4, 7 pgs.

Wu, W., et al., "A New Efficient Control Method for Blended Wing Body," Fourth International Symposium on Physics of Fluids (ISPF4), 2012, 19:396-405, 10 pgs.

FIG. 3

PROPELLER OUTER SLIPSTREAM CONTROL SYSTEM FOR COUNTER-ROTATING PROPELLERS

CROSS REFERENCE TO RELATED APPLICATIONS

This application claims priority to U.S. Provisional Patent Application Ser. No. 62/197,156, filed Jul. 27, 2015, titled "Forward Propeller Outer Slipstream Control System For Counter-Rotating Propellers", and to U.S. Provisional Patent Application Ser. No. 62/325,689, filed Apr. 21, 2016, titled "Propeller Outer Slipstream Control System For Counter-Rotating Propellers", the entire contents of both of which are incorporated by reference herein.

BACKGROUND

Use of counter-rotating propellers is well known, offering the possible benefit of increased propeller system power density and elimination of power wasting swirl from the downstream prop wash. However, there are also adverse effects leading to higher noise levels and difficulty keeping both propellers on their intended operating design points during changing power and flight conditions. A significant problem with prior art counter-rotating propellers is the mismatch of the forward prop tip slipstream to the aft prop tip as it goes through the plane of the aft propeller. If the front prop tip slipstream (and prop wash) do not pass through the aft prop as desired, the aft prop performance and noise levels can be adversely affected. If the front prop tip slipstream passes outside the aft prop tip diameter, a partial prop wash outer swirl will persist downstream reducing potential prop set performance. If the front prop tip slipstream passes radially inward from the aft prop tip, the aft prop tip operates in an unintended region of low axial velocity free stream flow resulting in tip stall and corresponding high noise levels at low vehicle velocities and high prop power levels.

It is believed that no one prior to the inventor has made or used the invention described in the appended claims.

BRIEF DESCRIPTION OF THE DRAWINGS

The accompanying drawings together with specification, including the detailed description which follows, serve to explain the principles of the present invention.

FIG. 3 is a chart presenting modeled mission profile parameters based on an aircraft with a counter rotating propeller system utilizing a control system in accordance with the teachings of the present disclosure.

DETAILED DESCRIPTION

Figure 1:
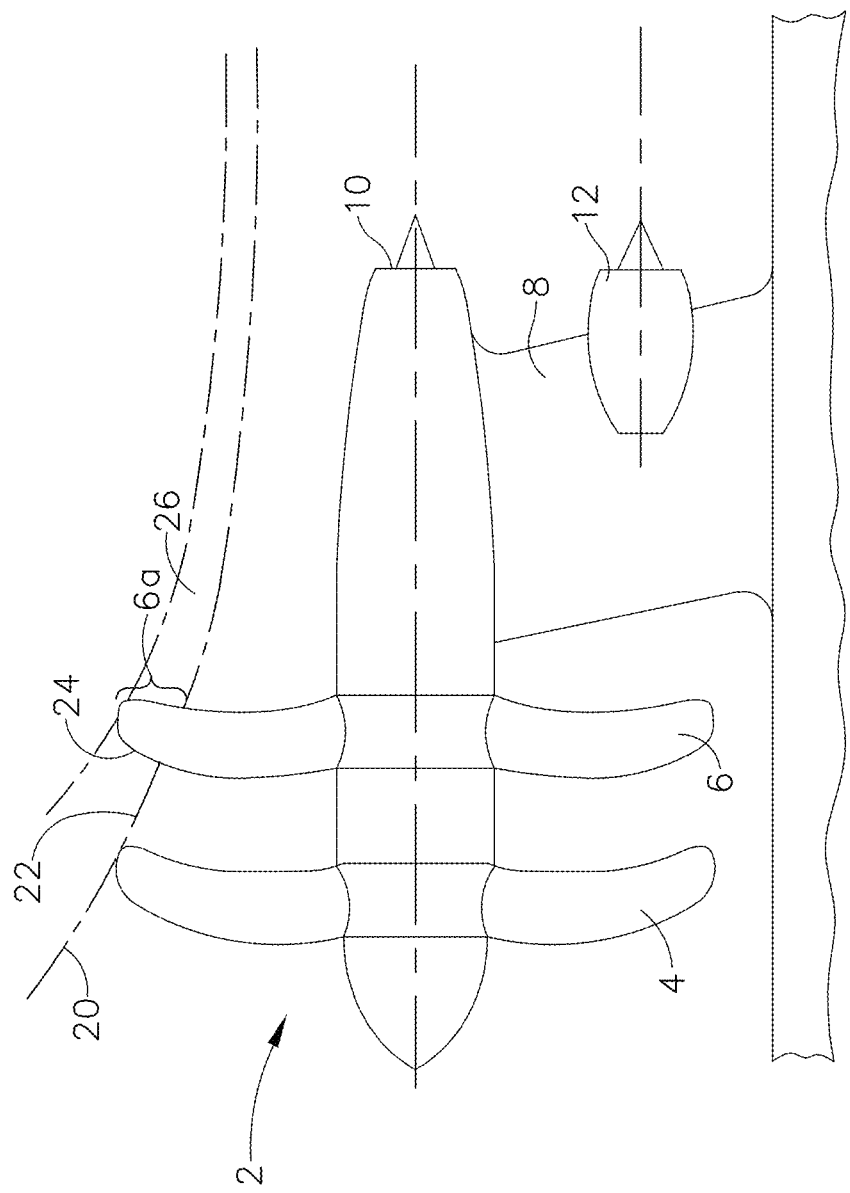
FIG. 1 illustrates prop wash interaction of a prior art counter rotating propeller system operating off its design point.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

Any disclosure or portion thereof of any patent, publication or other disclosure material that is incorporated by reference herein which conflicts with definitions, statements or other disclosure material set forth herein will only be incorporated to the extent that no conflict arises between that incorporated material and the existing disclosure material.

The word "exemplary" is used herein to mean "serving as an example, instance, or illustration." Any implementation described herein as "exemplary" is not necessarily to be construed as preferred or advantageous over other implementations.

Referring to the drawings, FIG. 1 illustrates counter rotating propeller system 2 comprising front, or fore, propeller 4 and rear, or aft, propeller 6 mounted on pylon 8. Propellers 4, 6 may be driven in any suitable manner, such as by a common engine or individually by separate engines. As depicted in FIG. 1, engine exhausts 10, 12 are mounted on pylon 8. To illustrate the difficulty of matching the fore and aft prop aerodynamically throughout an entire operating regime (e.g., take-off, climb, cruise, descent, landing), a low Mach high power density prop wash is depicted such as is encountered during air frame rotation on take-off (Only the slipstream lines on one side of the propeller system is illustrated for clarity, it being recognized that the slipstream lines are generally axial symmetrical subject to boundary conditions and structures.) Due to the relatively low vehicle speed and high propeller power density, the inlet prop stream is accelerated in front of front propeller 4 leading to converging inlet stream 20. Because so much power is imparted to the stream going through front propeller 4, a relatively large velocity increment is imparted to the prop wash, resulting in a sharply converging prop wash stream 22 entering rear propeller 6 as illustrated.

When operating at the propeller system's design point, such as during high Mach cruise, the prop wash coming out of front propeller 4 will have a much larger diameter. The diameter of rear propeller 6 is illustrated in FIG. 1 as being properly designed for such a design point. Thus, when operating under the low Mach high power density conditions illustrated in FIG. 1, the high power front prop tip streamline and prop wash, following converging prop wash stream 22, will hit the rear propeller 6 radially inward from its tip, as shown.

As a result of this mismatch of the slipstream and rear propeller 6 diameter, the outer portion of rear propeller 6 will ingest free stream air 24 at a low axial velocity, resulting in rear propeller tip region 6a operating in stall with an extremely high incidence angle. This lowers the achievable rear propeller efficiency when operated off design point such as at low speeds and high power.

Another result of this mismatch is that, if rear propeller tip region 6a pumps any significant air flow, outer prop wash 26 will exit rear propeller 6 with an energy wasting swirl. Additionally, any tip vortices or disturbances shed from the highly loaded front propeller tip 4a will impact the rear propeller 6 and combine with the tip region rear propeller stall noise and create an acoustic problem during take-off and early climb.

Figure 2:
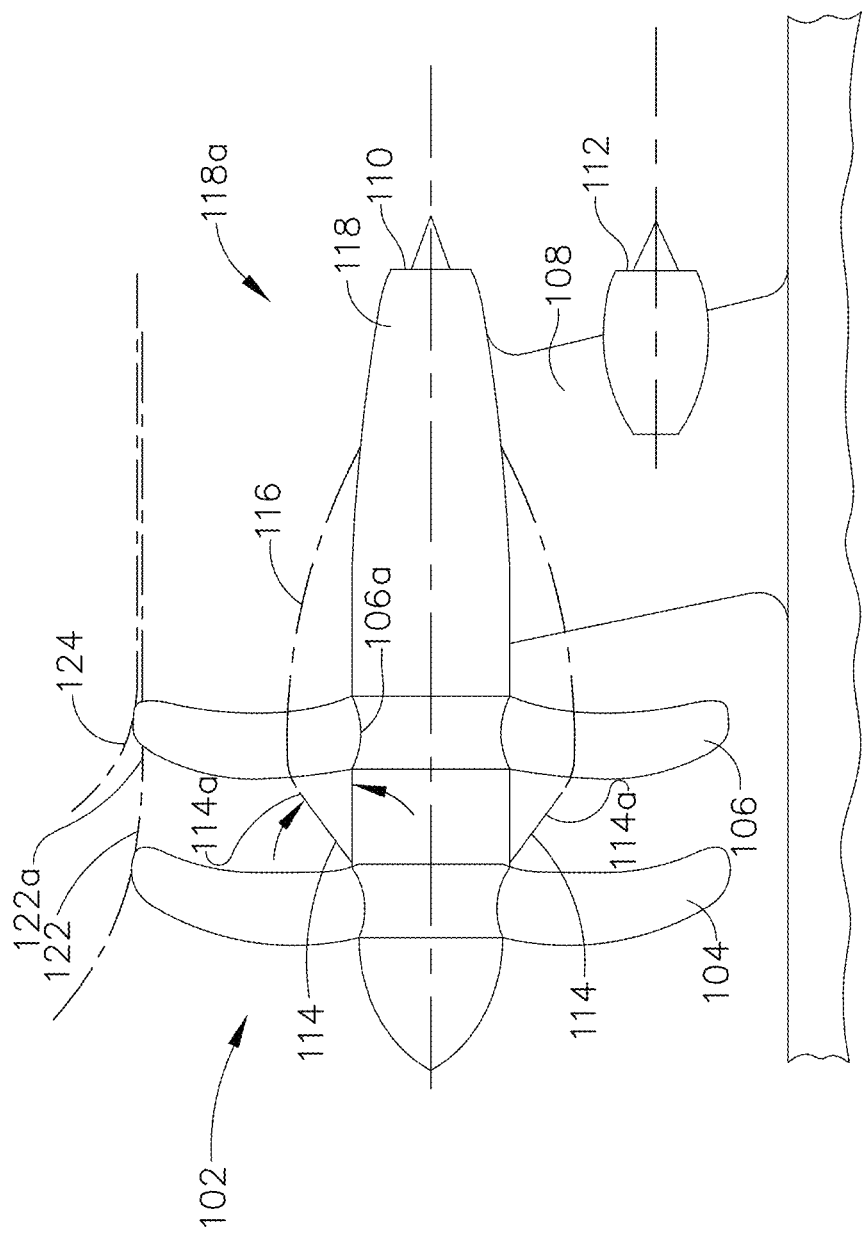
FIG. 2 illustrates prop wash interaction of a counter rotating propeller system utilizing a control system in accordance with the teachings of the present disclosure.

FIG. 2 illustrates counter-rotating propeller system 102 comprising coaxial front propeller 104 and rear propeller 106 mounted on pylon 108. Front propeller 104 and rear propeller 106 are spaced apart axially: As used herein, "inter-hub" refers to the region between the rotating hub of front propeller 104 and the rotating hub of rear propeller 106. Propeller 104, 106, may be driven in any suitable manner, such as by a common engine or individually by separate engines. As depicted in FIG. 2, engine exhausts are optionally mounted on pylon 108 and at the rear of center body support 118. Any suitable power plants, drives and exhausts, as well as other components may be used in practicing the inventions hereof. Propellers 104, 106 may be of any suitable configuration, and may be configured as pusher propellers as well as the depicted tractor propellers.

Propeller system 102 comprises a structure configured to control the front propeller outer slipstream and prop wash, and specifically disclosed is a structure configured to vary the effective hub to tip radius ratio of rear propeller 106. Although any suitable structure may be used, the structure depicted in FIG. 2 comprises inter-hub movable waist cowl 114 disposed between front propeller 104 and rear propeller 106. Variable waist cowl 114 is configured so that trailing edge 114a is movable outwardly thereby increasing the effective hub to tip radius ratio of rear propeller 106. Variable waist cowl 114 may be configured with a segmented leading edge which is fixed axially but rotatable at the exit of the front propeller hub and its trailing edge variably elevated at the inlet to the rear hub of rear propeller 106. Variable waist cowl 114 may comprise a two layer segmented structure, flexible at its leading edge with spacers between the activated segments to maintain an aerodynamically smooth surface configured to deflect the inner prop wash outwardly. Movement may be actuated mechanically, electrically, hydraulically or by any suitable means.

As seen in FIG. 2, when in an expanded position, such as is shown, trailing edge 114a deflects the inner hub region prop wash, resulting in a region of flow separation 116 immediately aft of rear propeller hub 106a. This separated prop wash region flow should re-attach to the rear portion 118a of central body support 118 or downstream.

The outward deflection of the inner hub region prop wash reduces the outer convergence of the front prop 104 prop wash 122, tending to keep the front prop tip streamline properly aligned with the rear prop tip, illustrated at 122a, through nearly all, or all of the operating regime. With this passing of the front prop tip slipstream coincident through the rear propeller tip, the amount of ingested free stream air 124 is nearly or completely eliminated when propeller system 102 is operated at off design points. Essentially, this variable control of radial location of front prop 104 tip streamline allows propeller system 102 to operate at its design point with respect to prop wash position on rear propeller 106 outer regions through most of the entire operating regime. Adverse effects, such as unintended rear prop tip stall or operation at excessive incidence angles is thereby prevented or largely eliminated.

Figure 3:
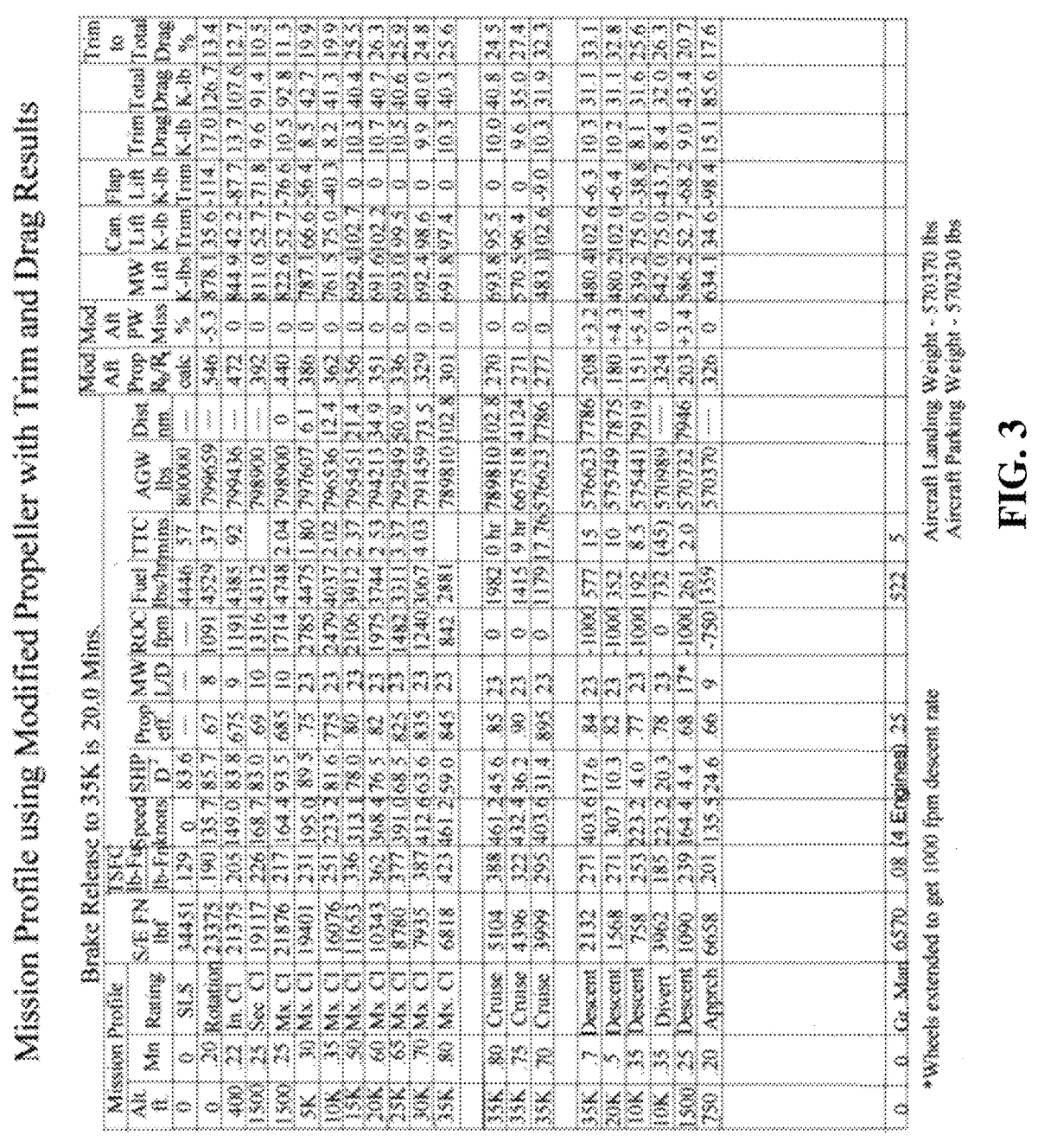
Figure 4:
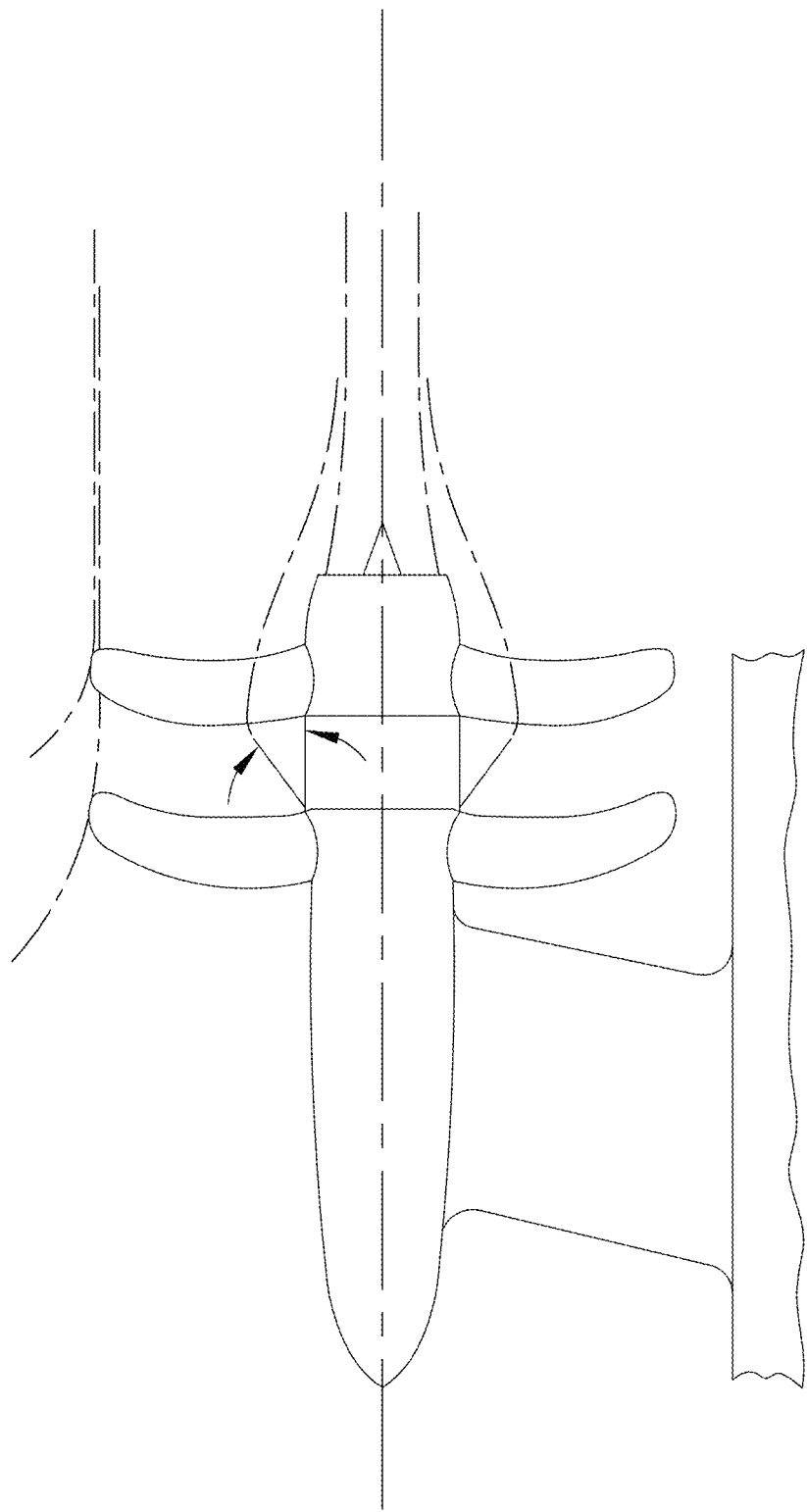
FIG. 4 illustrates prop wash interaction of a counter-rotating pusher system as might be used with an aircraft gas turbine engine utilizing a tip slipstream and prop wash control system in accordance with the teachings of the present disclosure.

By way of example, for a cruise design hub to tip radius ratio of 0.270 on rear propeller 106, the described simple two layer segmented variable waist cowl could provide up to about a 0.500 hub to tip radius ratio when fully extended. As the chart of FIG. 3 illustrates the calculated radius ratios required to match the rotation through landing front prop 104 prop wash to the outer portion of rear prop 106 area and ranges from 0.151 to 0.546. Since 0.546 is larger than the 0.500 limit of the variable waist cowl, there is a 5.3% area prop wash miss of the outer aft prop 106 at rotation, but the miss is quickly reduced to zero before the air frame leaves the airport boundaries and from there on there is a 0% miss for the rest of climb and cruise. Lack of prop wash miss of the outer regions of rear prop 106 maximizes its efficiency and eliminates any possibility of downstream swirl losses. Larger hub radius ratio designs such as the turboprop counter-rotating pusher version shown in FIG. 4 would allow an effective simple construction variable waist cowl to achieve an effective 0.600 radius ratio such that front prop 104 outer tip streamline could be diverted out beyond rear prop 106 tip if desired. (See columns labeled "Mod. Aft Prop Rh/Rt calc" and "Mod Aft PW Miss %" in FIG. 3)

Control of the variable waist cowl may be a part of the overall engine control system just like the propeller pitch control or operating rotational speeds and may be controlled in response to changing flight conditions. The control system may be configured to control the structure in a manner that effects the various control aspects. For example, the control system may be configured to control the structure, for example a waist cowl in accordance with the teachings hereof, to deflect the inner hub region prop wash outwardly to reduce the outer convergence of the front prop 104 prop wash 122. Such control may be configured to control the structure to operate propeller system 102 at its design point with respect to prop wash position on rear propeller 106 outer regions through most of the operating regime of the propeller system. The control may be configured to control the structure to minimize or eliminate unintended rear propeller tip stall or operation at high incidence angles.

The foregoing description of an embodiment has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments of the invention are explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology had been used for the sake of clarity. To the extent that the term "includes" is used in either the detailed description or the claims, such term is intended to be inclusive in a manner similar to the term "comprising" as "comprising" is interpreted when employed as a transitional word in a claim. It is to be understood that each specific term includes all technical equivalents which operate in a similar manner to accomplish a similar purpose. It is intended that the scope of this provisional filing will be better defined by the claims submitted with a later non-provisional filing. It is intended that the scope of the invention be defined by the claims submitted herewith.

What is claimed is:

1. A counter rotating propeller system comprising:
   a. a front propeller axially aligned with a rear propeller, the front and rear propellers spaced apart axially thereby defining an inter-hub region; and
   b. a waist cowl disposed in the inter-hub region, the waist cowl configured to variably control a prop wash and an outer slipstream of the front propeller, the waist cowl comprising
      i. a rotatable leading edge which is fixed axially; and
      ii. a trailing edge adjacent the rear propeller, the trailing edge configured to be variably elevated.

2. The propeller system of claim 1, wherein the waist cowl is configured to control an outer convergence of the prop wash of the front propeller.

3. The propeller system of claim 1, wherein the waist cowl is configured to vary an effective hub to tip radius ratio of the rear propeller.

4. A counter rotating propeller system comprising:
   a. a front propeller axially aligned with a rear propeller, the front and rear propellers spaced apart axially thereby defining an inter-hub region;
   b. means disposed in the inter-hub region for variably controlling a prop wash and an outer slipstream of the front propeller, wherein the means comprises means for varying an effective hub to tip radius ratio of the rear propeller.

5. The propeller system of claim 4, wherein the means for variably controlling the prop wash and the outer slipstream of the front propeller further comprises means for controlling an outer convergence of the prop wash of the front propeller.

6. The propeller system of claim 4, wherein the means for variably controlling the prop wash and the outer slipstream of the front propeller further comprises means for controlling an outer convergence of the prop wash of the front propeller in response to changing flight conditions.

7. A counter rotating propeller system comprising:
   a. a front propeller axially aligned with a rear propeller, the front and rear propellers spaced apart axially thereby defining an inter-hub region;
   b. a waist cowl disposed in the inter-hub region, the waist cowl configured to variably control a prop wash and an outer slipstream of the front propeller, wherein the waist cowl comprises a trailing edge, and the trailing edge is variably elevated to cause a front propeller tip slipstream to pass coincident through a rear propeller tip through at least most of an operating regime of the propeller system.

8. The propeller system of claim 7, wherein the waist cowl is configured to control an outer convergence of the prop wash of the front propeller.

9. The propeller system of claim 7, wherein the waist cowl is configured to vary an effective hub to tip radius ratio of the rear propeller.

10. A counter rotating propeller system comprising:
    a. a front propeller axially aligned with a rear propeller, the front and rear propellers spaced apart axially thereby defining an inter-hub region; and
    b. a waist cowl disposed in the inter-hub region, the waist cowl configured to variably control a prop wash and an outer slipstream of the front propeller, the waist cowl comprising a trailing edge disposed at a position, wherein the position of the trailing edge is dependent on flight conditions.

11. The propeller system of claim 10, wherein the prop wash comprises an inner hub region prop wash, and wherein the position of the trailing edge deflects the inner hub region prop wash outwardly.

12. A counter rotating propeller system comprising:
    a. a front propeller axially aligned with a rear propeller, the front and rear propellers spaced apart axially thereby defining an inter-hub region; and
    b. a waist cowl disposed in the inter-hub region, the waist cowl configured to variably control a prop wash and an outer slipstream of the front propeller, the waist cowl comprising a trailing edge, the trailing edge is disposed at a position at which the propeller system operates at its design point with respect to a prop wash position on the rear propeller.

13. A counter rotating propeller system comprising:
    a. a front propeller axially aligned with a rear propeller, the front and rear propellers spaced apart axially thereby defining an inter-hub region; and
    b. a waist cowl disposed in the inter-hub region, the waist cowl, the waist cowl configured to variably control a prop wash and an outer slipstream of the front propeller wherein the prop wash comprises an inner hub region prop wash, and wherein when a trailing edge of the waist cowl is elevated, the waist cowl comprises an aerodynamically smooth surface configured to deflect the inner hub region prop wash outwardly.

\* \* \* \* \*